United States Patent [19]

Röck et al.

[11] 4,236,848

[45] Dec. 2, 1980

[54] FURNITURE CONNECTOR

[75] Inventors: Erich Röck, Höchst; Bernhard Mages, Dornbirn, both of Austria

[73] Assignee: Julius Blum Gesellschaft m.b.H., Höchst, Austria

[21] Appl. No.: 902,815

[22] Filed: May 4, 1978

[30] Foreign Application Priority Data

May 13, 1977 [AT] Austria ............................ 3432/77

[51] Int. Cl.² ............................................ B25G 3/00
[52] U.S. Cl. .................................. 403/406; 403/231; 403/297; 403/DIG. 10
[58] Field of Search ............... 403/231, 405, 406, 407, 403/409, 297, DIG. 10

[56] References Cited

U.S. PATENT DOCUMENTS

| 4,025,414 | 5/1977 | Vendramini ............... 403/409 X |
| 4,060,949 | 12/1977 | Busse ............................ 403/231 X |
| 4,089,614 | 5/1978 | Harley ......................... 403/407 |

FOREIGN PATENT DOCUMENTS

| 2358163 | 6/1974 | Fed. Rep. of Germany ......... 403/231 |
| 1954810 | 11/1977 | Fed. Rep. of Germany ......... 403/231 |
| 2617558 | 11/1977 | Fed. Rep. of Germany ......... 403/407 |
| 2524505 | 12/1977 | Fed. Rep. of Germany ......... 403/407 |

Primary Examiner—Wayne L. Shedd
Attorney, Agent, or Firm—Wenderoth, Lind & Ponack

[57] ABSTRACT

A furniture connector consists of two parts, one a dowel pin or a screw, and the other a dowel casing of wider diameter than the pin or screw. The pin or screw is insertable and securable in the casing thereby bracing or welding the casing into a hole of the furniture part.

9 Claims, 8 Drawing Figures

FURNITURE CONNECTOR

BACKGROUND OF THE INVENTION

1. FIELD OF THE INVENTION

The invention relates to a furniture connector for connecting two furniture parts positioned at a right angle to each other. The connector includes a dowel-like housing to be inserted into a bore in one furniture part and bears an expansion member, e.g. an expansion screw, to be anchored directly in the other furniture part or indirectly therein by means of a dowel pin for example, the rotation axes of said expansion member and the housing being staggered with respect to each other at an angle of 90.

2. DESCRIPTION OF THE PRIOR ART

Such furniture connectors have frequently been used in industrial furniture production. It is their task to connect the parts forming the body of the piece of furniture, i.e. the covering and bottom plate and the side walls, in such a way that sufficient stability is provided.

It is one object of furniture connectors to create a certain coupling force between the furniture parts to be connected. Moreover, such furniture connectors should be linkable to the inside of the piece of furniture and covered towards the outside, and they should, furthermore, be easily accessible to tools.

As already mentioned, conventional furniture connectors substantially consist of two parts, i.e. of a dowel-like housing that is inserted into a wall of one furniture part, adjacent to the side face of such wall, and of a pin-shaped or screw-shaped expansion member that is inserted into the other furniture part and rests in the housing and laterally projects from the outer surface of the housing.

With such furniture connectors, the furniture part taking up the housing must be provided with two bores for each furniture connector. One bore for the housing is disposed in the furniture wall and one corresponding bore is disposed in the side face of the plate and allows for the insertion of the expansion member.

SUMMARY OF THE INVENTION

It is the object of the invention to provide a furniture connector of the above-mentioned kind which does not require a bore in the side face of the plate taking up the housing, thus considerably reducing the required amount of work during the course of furniture production.

According to the invention this is achieved by providing an expansion member which, when being moved towards the edge of the housing presses the wall of the housing laterally on both sides of its outer surface onto the wall of the bore receiving the housing.

By bracing the wall of the housing apart at an angle to the coupling direction, the coupling force of the furniture connector does not act on the flange lying between the bore for the housing and the side face of the plate, but is laterally diverted. Thus, it is possible to dispose the housing directly at the side face of the plate and particularly to provide a bore for the housing, the diameter of the bore extends beyond such side face.

A preferred embodiment provides that the outer surface of the housing is flattened in the area through which the expansion member protrudes. With conventional furniture connectors the housing would be pulled out of the furniture part in which it is mounted in case of great strain. With furniture connectors according to the invention the forces acting on the housing are laterally diverted and the housing is securely braced in the furniture part.

The bracing effect is improved by dividing the housing by one or more separating slots in the area through which the expansion member protrudes, whereby the separating slots can be staggered with respect to one another.

One embodiment of the invention provides that the wall of the housing is approximately a low cylinder of circular cross-section which is discontinued in the portion where the expansion member is mounted, whereby the wall of the housing corresponds in this portion to a segment of a circle directed towards the inside of the cylinder and opposed to the coupling direction of the expansion member.

In this embodiment the bracing of the housing is obtained by the toggle lever principle.

A further embodiment provides that the housing has a recess conically narrowing in the direction of the outer surface, and preferably corresponding to, inclined faces of the expansion member which press against the walls of the recess when the coupling force becomes effective, such inclined faces being directly or indirectly disposed on the expansion member. The inclined faces of the expansion member can preferably be disposed on a separate clamping member. The expansion member, for example, may be a screw, and the clamping member, which has a female thread, is screwed onto the screw and moves along the spindle of the expanding screw when the expansion screw is turned.

BRIEF DESCRIPTION OF THE DRAWINGS

In the following various embodiments will be described in more detail with reference to the figures of the accompanying drawings without being limited thereto, and wherein.

DESCRIPTION OF THE PREFERRED EMBODIMENTS

Figure 1:
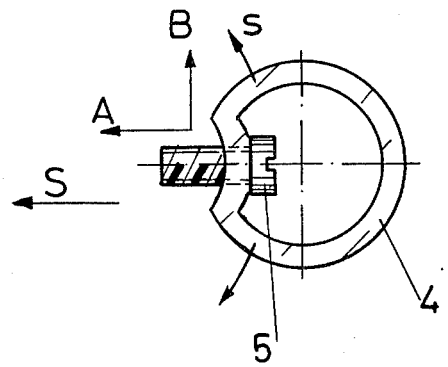
FIGS. 1 through 4 are top views of furniture connectors according to the invention.

In the figures of the drawings the furniture parts 1 and 2 are to be connected. Into a furniture part 1, e.g. a side-wall, is inserted a dowel pin 3 according to the illustrated embodiments. An expansion member 5 in the form of a screw extends into this dowel pin 3. The head 5' of the expansion member 5 is mounted within a housing 4 which is inserted into the other furniture part 2, e.g. a bottom plate of a piece of furniture.

The housing 4 has a recess 8 having conically converging side faces 8' directed towards the expansion member 5. The expansion member 5 has a screwed clamping member 6 with inclined faces 6' corresponding to the inclined faces 8' of the recess of the housing 4.

If the screw forming the expansion member 5 is turned and the clamping member 6 consequently moves in the direction of arrow S, the walls of the housing 4 adjacent to the front face 2' of the furniture part 2 are laterally pressed into the walls of the bore in part 2, in the directions of arrows s.

Figure 7:
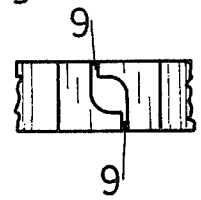
Figure 8:
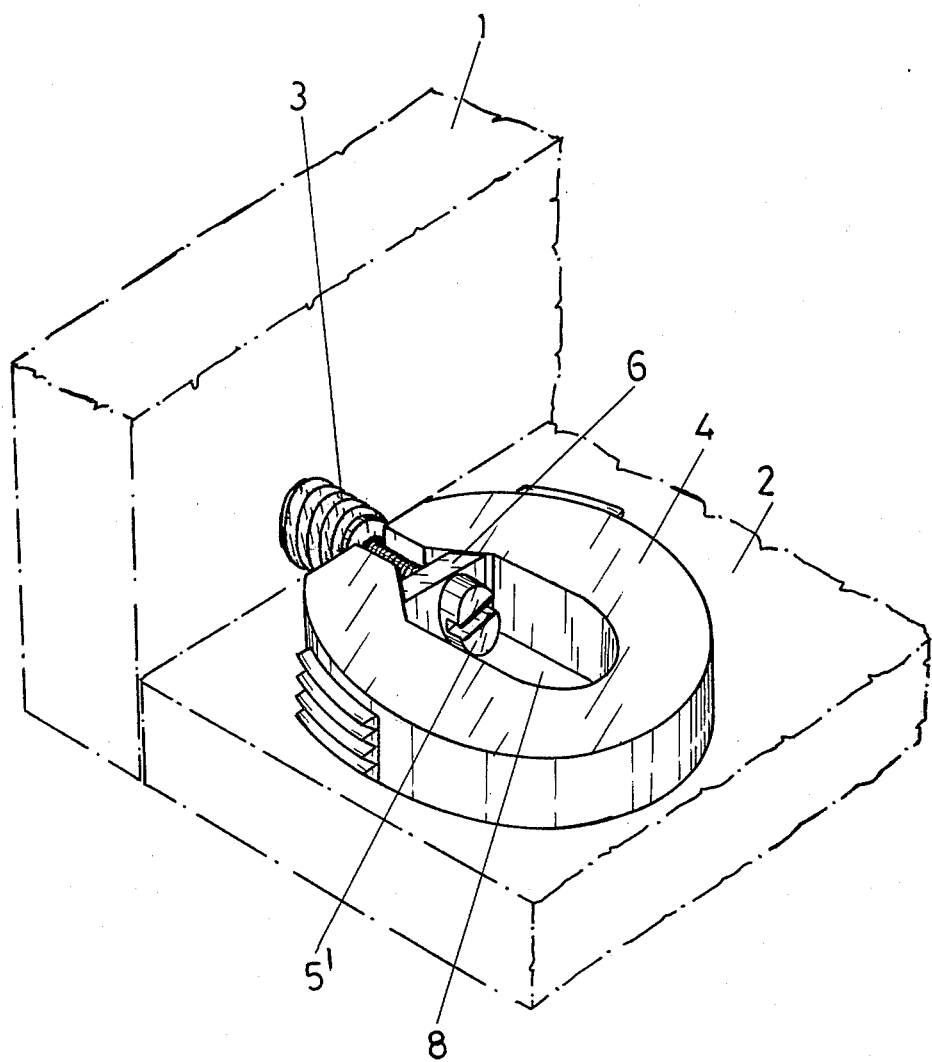
FIG. 8 is a three-dimensional view of a furniture connector.

In order to facilitate the bracing apart of the housing 4, it is provided that the housing 4 is divided by separating slots 9 in the area of housing 4 through which the expansion member 5 protrudes. As illustrated in FIG. 7, the separating slots can be staggered.

Figure 3:
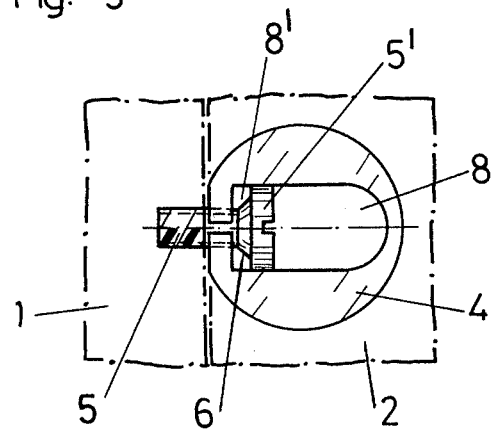

FIG. 3 shows an embodiment in which the expansion member 5 has no separate clamping member 6 but in which the inclined faces 6' pressing against the inclined faces 8' of the recess 8 are directly disposed on the head 5' of the expansion member.

Figure 2:
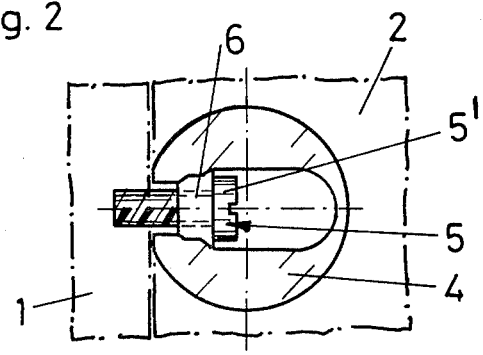
Figure 4:
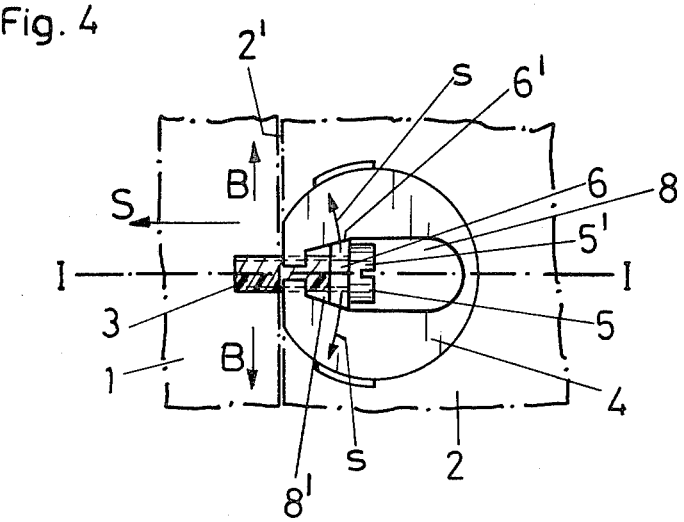
Figure 5:
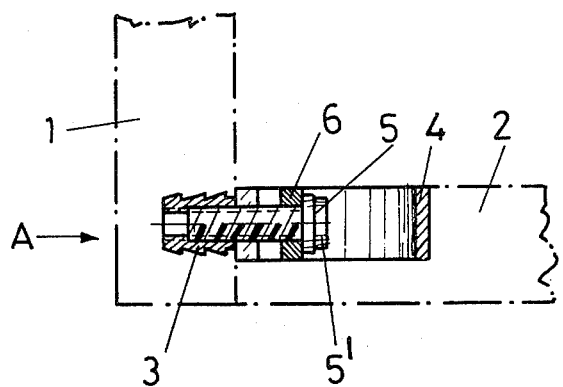
FIG. 5 is a section along line V—V of FIG. 4.
Figure 6:
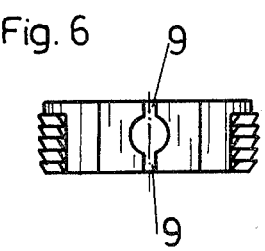
FIGS. 6 and 7 are views from the direction of arrow A of FIG. 5, the expansion member not being shown.

FIG. 2 shows an embodiment substantially corresponding to the embodiment according to FIGS. 4 and 5, but in which the faces of the co-acting parts resting against each other, e.g. the inclined faces 6' of the clamping member 6 and 8' of the recess wall, are stepped.

FIG. 1 shows an embodiment in which the housing 4 is braced according to the toggle lever principle. If the expansion member 5 is pulled in the direction of arrow S the wall of the housing is pressed into the bore walls in the directions of arrows s. The housing 4 is preferably made of platics. This is true for all embodiments.

We claim:

1. A furniture connector for connecting two furniture parts aligned and abutted at a right angle to each other, said furniture connector comprising:
    a dowel-like housing having a central axis, said housing having axially extending therethrough an opening, said housing adapted to be fitted within a bore in a first furniture part and including a portion adapted to be positioned adjacent a second furniture part to be connected to the first furniture part, said portion of said housing being axially divided by at least one separating slot extending through said portion from said opening to the outer surface of said housing;
    an elongated expansion member having an axis and extending through said portion of said housing, said expansion member having head means within said opening for rotation of said expansion member and thread means adapted to be threadably anchored in the second furniture part upon rotation of said head means and for thereby moving said housing and the first furniture part axially of said expansion member toward the second furniture part;
    said axes of said housing and said expansion member extending at a right angle to each other; and
    clamping means, positioned to be urged by said head means upon rotation thereof, for causing said housing, upon movement thereof toward the second furniture part, to expand outwardly against a wall of the bore formed in the first furniture part, in separate directions extending on opposite sides of said expansion member and diverging outwardly from said axis thereof.

2. A connector as claimed in claim 1, wherein said portion of said housing has a planar outer surface.

3. A connector as claimed in claim 2, wherein said planar outer surface is adapted to contact the second furniture part.

4. A connector as claimed in claim 1, comprising two said slots positioned in staggered positions.

5. A connector as claimed in claim 1, wherein said opening has inclined surfaces converging axially of said expansion member toward the second furniture part, and said clamping means includes inclined faces complementary to and in engagement with said inclined surfaces.

6. A connector as claimed in claim 5, wherein said inclined faces are integral with said expansion member.

7. A connector as claimed in claim 5, wherein said inclined faces are on a separate clamping member which is mounted on said expansion member.

8. A connector as claimed in claim 7, wherein said clamping member has female threads in engagement with said thread means of said expansion member.

9. A furniture connector for connecting two furniture parts aligned and abutted at a right angle to each other, said furniture connector comprising:
    a dowel-like housing having a central axis, said housing having axially extending therethrough an opening, said housing adapted to be fitted within a bore in a first furniture part and including a portion adapted to be positioned adjacent a second furniture part to be connected to the first furniture part, said housing comprising a cylinder of circular cross-section, the circumference of said cylinder being discontinued at said portion, said portion having the configuration of a circular segment directed toward the interior of said cylinder;
    an elongated expansion member having an axis and extending through said circular segment portion of said housing, said expansion member having head means within said opening for rotation of said expansion member and thread means adapted to be threadably anchored in the second furniture part upon rotation of said head means and for thereby moving said housing and the first furniture part axially of said expansion member toward the second furniture part;
    said axes of said housing and said expansion member extending at a right angle to each other; and
    said circular segment portion forming clamping means, to be urged by said head means upon rotation thereof, for causing said cylinder of said housing, upon movement thereof toward the second furniture part, to expand outwardly against a wall of the bore formed in the first furniture part, in separate directions extending on opposite sides of said expansion member and diverging outwardly from said axis thereof.

* * * * *